Dec. 15 1925.

J. L. FIFER

SEED PLANTER

Filed July 6, 1923

James L. Fifer
INVENTOR

BY Victor J. Evans
ATTORNEY

WITNESS:

Dec. 15, 1925.
J. L. FIFER
1,566,187
SEED PLANTER
Filed July 6, 1923
2 Sheets-Sheet 2
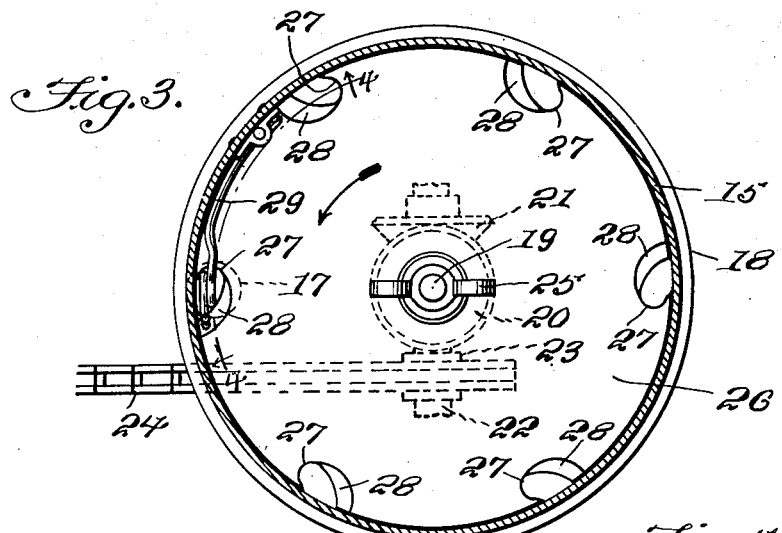
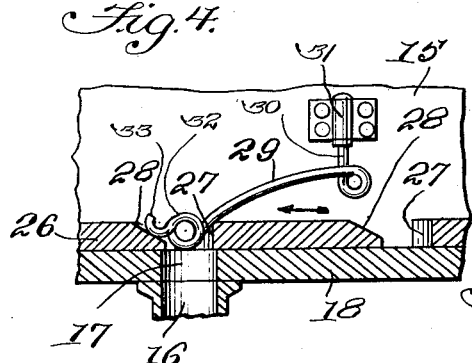
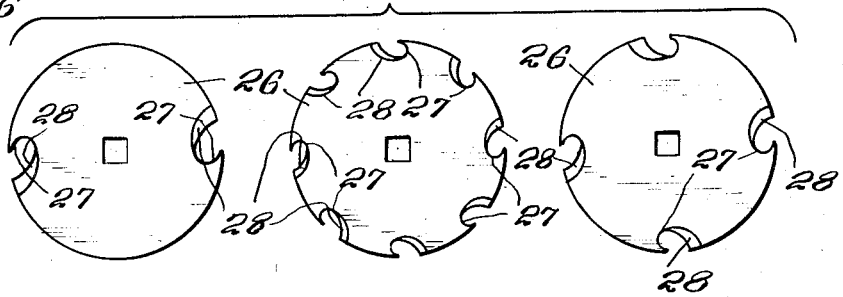
James L. Fifer
INVENTOR
BY Victor J. Evans
ATTORNEY
J. L. Wright
WITNESS:

Patented Dec. 15, 1925.

1,566,187

UNITED STATES PATENT OFFICE.

JAMES L. FIFER, OF VALE, OREGON.

SEED PLANTER.

Application filed July 6, 1923. Serial No. 649,955.

*To all whom it may concern:*

Be it known that I, JAMES L. FIFER, a citizen of the United States, residing at Vale, in the county of Malheur and State of Oregon, have invented new and useful Improvements in Seed Planters, of which the following is a specification.

This invention relates to planting machinery, and has for its object the provision of a novel seed distributor or planter of such construction that the operator may actually see the seeds being fed to the dropper and forced thereinto.

An important and more specific object is the provision of a planting mechanism of this character embodying a rotary disk dipping into the mass of seeds and formed with pockets of a desired size which will catch one or more seeds as desired and bring them up in view of the operator and discharge them into a planting boot or dropper, the device having the great advantage of enabling the operator to detect at once whether or not any hills are being skipped.

Another object is the provision of a device of this character provided with spring means for actively forcing the seeds out of the pockets if for any reason they should have a tendency to stick therein, this feature insuring positive planting.

Still another object is the provision of a device of this character which will economize on seeds inasmuch as it eliminates the usual thick sowing and obviates all necessity for subsequent thinning of the growing plants.

An additional object is the provision of a structure of this character which will be simple and inexpensive to manufacture, easy to operate, efficient and durable in service and a general improvement in the art.

With the above and other objects and advantages in view the invention consists in the details of construction to be hereinafter more fully described and claimed and illustrated in the accompanying drawings, in which:

Figure 3 is a longitudinal section through the hopper,

Figure 4 is a section therethrough on the line 4—4 of Figure 3,

Figure 5 is a detail section on the line 5—5 of Figure 2, and

Figure 6 shows variations in details of the feed wheel.

Figure 1:
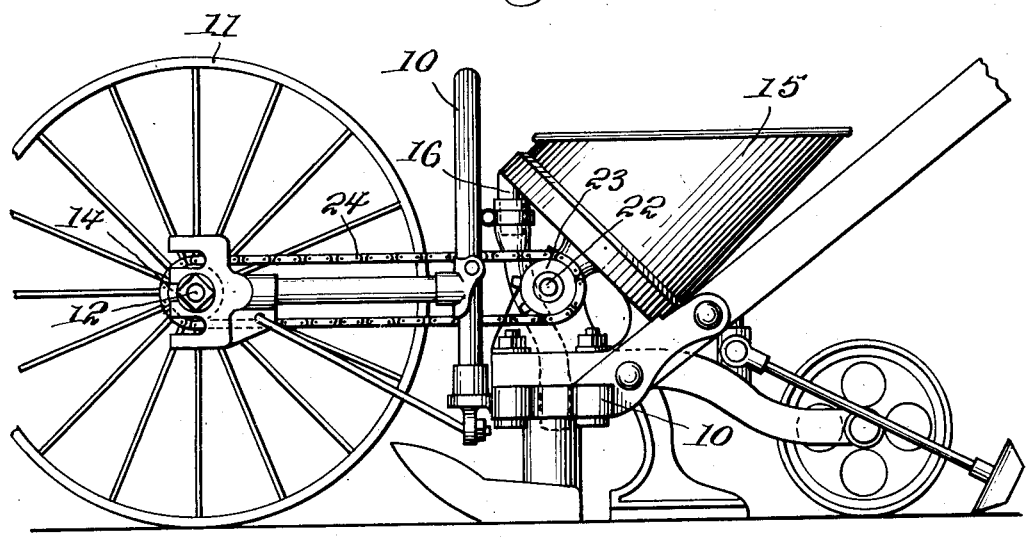
Figure 1 is a side elevation of a machine embodying my invention.
Figure 2:
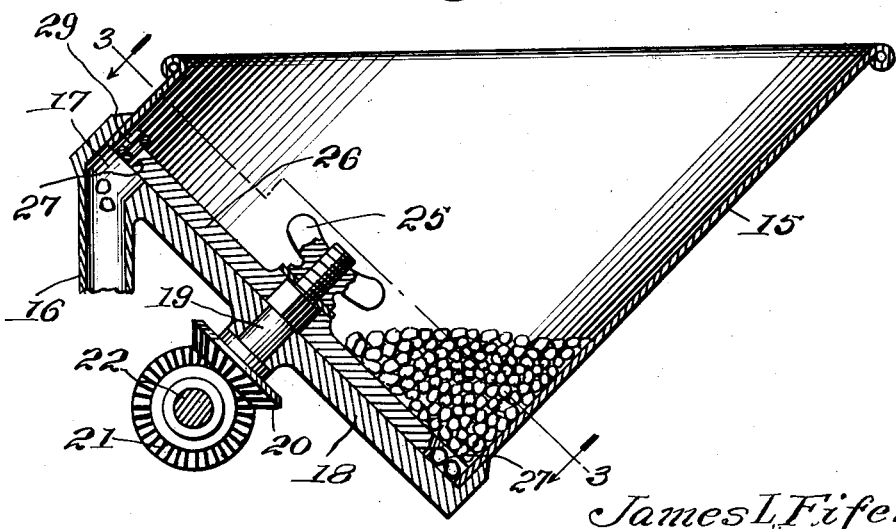
Figure 2 is a sectional elevational view thereof.

Referring more particularly to the drawings I have shown my machine as comprising a supporting frame 10 mounted upon ground engaging wheels 11 carried by a suitable axle structure 12. Any desired draft means indicated at 13 may be provided for drawing the machine along the ground and if desired a seat may be provided for the operator, or the operator may walk behind the device, the latter arrangement being probably preferable. Various changes in the arrangement of these parts may be resorted to as these features are really non-essential especially as they are capable of such wide variation. Suffice it to say that either the axle or one of the ground engaging wheels must carry either a sprocket indicated at 14 or its equivalent, as for instance a gear.

In carrying out my invention I provide a hopper 15 which is suitably mounted on the frame 10 and which may be of any desired size and configuration, though it is preferable that its bottom be inclined at an angle of 45°. This hopper is designed to contain whatever seeds are to be planted. Depending at the front of the hopper and secured thereto or else secured to the frame as preferred, is a seed tube, dropper or boot indicated by the numeral 16. The top part of the hopper is provided with an opening 17 which leads into this seed tube.

Secured against one side of the bottom of the hopper, namely the side toward the seed tube is a reinforcing plate or base 18 through which is journaled a stub shaft 19 carrying a bevel gear 20 meshing with a bevel gear 21 on a countershaft 22 which carries a sprocket 23 having trained thereabout a chain 24 which is, in turn, trained about the sprocket 14 carried by one ground wheel. The other end of this stub shaft 19 carries a nut member 25 preferably of the wing type for a purpose to be described.

Located within the hopper and removably engaged upon the stub shaft, which, incidentally is preferably angular in cross section, is the distributor disk 26 of any suitable diameter but sufficiently large to extend from near the bottom of the hopper to the upper edge, the periphery of the disk extending beyond the opening 17. At its edge this disk is formed with a plurality of pockets 27 which extend at an angle inwardly from the edge and each of which has one wall beveled at 28 to facilitate the entry of seeds into the pocket. The purpose of the nut 25 is to hold this disk in place while permitting the disk to be removed and replaced by another having pockets of different sizes, it being intended that the machine when sold commercially be equipped with a plurality of disks having pockets of different sizes spaced different distances apart.

Mounted within the upper portion of the hopper is a leaf spring 29 which bears upon the disk near its edge and which snaps into the successive pockets as they register with the opening 17 for the purpose of forcibly ejecting any seeds which may stick in the pockets. This ejector is formed from a length of resilient wire and is formed with a vertical stem 30 which is supported in a bracket 31 carried by the inner face of the hopper. This resilient wire is formed with a coil 32 at its free end adapted to successively snap into and out of the openings or pockets and terminates in a curved extension 33 adapted to ride over these inclined or beveled sides of the openings. It will be noted that this curved extension passing over the inclined sides of the openings will permit the disk to move freely without being retarded by the action of the spring. In other words, as the bevel edges 27 approach the curved extension 32 they tend to lift the resilient arm to prevent undue friction between this arm and the disk.

In the operation it will be seen that the hopper is filled to the desired depth with whatever seeds are to be planted, and the proper disk is used depending upon the size of the seeds and the number thereof to be planted in each hill, this selection being a matter within the discretion of the operator. As the machine travels along the ground the gearing drives the stub shaft 19 which carries the disk and as the disk rotates, the successive pockets are filled with seeds, one or more as the case may be, and these seeds are brought up in plain view of the operator to the top of the hopper whereupon they are discharged through the opening 17 into the seed tube or dropper 16. It is to be observed that gravity alone is not relied upon for the result as the spring operates to eject the seeds forcibly. If the operator should observe any empty pockets he may remedy this defect easily and in this way it is obvious that there will be no skips.

From the foregoing description and a study of the drawings it will be apparent that I have thus provided a simply constructed and consequently inexpensive seed planter which will be highly advantageous and which will efficiently perform all the functions for which it is intended. Owing to the fewness of the parts it is apparent that there is practically nothing to get out of order so that the device should have a long life.

It is to be noted that I have shown the device constructed as a single unit and forming part of a hand planter. It should however be distinctly understood that there is absolutely no limitation in this respect as it is quite possible to construct a machine having a considerably elongated hopper within which would be pivoted or journaled a plurality of the disks arranged in the same manner, generally speaking, as in the drawings forming part of this application, viz at an angle of 45 degrees whereby the operator may continually inspect and view the action to see whether or not everything is progressing properly. By providing a plurality of such disks and a plurality of dropping tubes and boots the device is capable of use for planting all kinds of grain on a larger scale while at the same time the seeds will be accurately placed at the proper distance apart. By providing proper gearing for advancing or retarding the speed the device can also be adapted for use in planting corn in hills and rows at any desired distance apart. This amplification of the principle is not illustrated as it may be construed as being simply a natural expansion of the idea.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

The combination with a hopper having an outlet opening, of a disk rotatable in the hopper and having a plurality of radially disposed openings adapted to successively register with the outlet opening and having their edges beveled at one side, such bevel extending from the upper face of the disk to a point adjacent its lower face, a bracket secured to the hopper, and a resilient ejector supported in the bracket, the ejector including a resilient arm terminating in a coil adapted to successively move into and out of the openings to eject the contents of the hopper through the same, and a curved extension on the coil adapted to successively contact with the bevel edges of the openings.

In testimony whereof I affix my signature.

JAMES L. FIFER.